(12) United States Patent
Dodwell et al.

(10) Patent No.: US 8,268,745 B2
(45) Date of Patent: Sep. 18, 2012

(54) SILICATE-RESISTANT DESULFURIZATION SORBENT

(75) Inventors: Glenn W. Dodwell, Bartlesville, OK (US); Robert W. Morton, Bartlesville, OK (US); Roland Schmidt, Bartlesville, OK (US)

(73) Assignee: China Petroleum & Chemical Corporation, Beijing (CN)

( * ) Notice: Subject to any disclaimer, the term of this patent is extended or adjusted under 35 U.S.C. 154(b) by 456 days.

(21) Appl. No.: 12/350,311

(22) Filed: Jan. 8, 2009

(65) Prior Publication Data

US 2010/0170394 A1  Jul. 8, 2010

(51) Int. Cl.
*B01D 53/02* (2006.01)
(52) U.S. Cl. ............ 502/405; 95/135; 95/136; 502/406; 502/407; 502/411
(58) Field of Classification Search .............. 95/135, 95/136; 502/405, 406, 407, 411
See application file for complete search history.

(56) References Cited

U.S. PATENT DOCUMENTS

| | | | | |
|---|---|---|---|---|
| 5,726,117 A * | 3/1998 | Khare et al. | ............... | 502/400 |
| 6,914,033 B2 * | 7/2005 | Gislason et al. | ............... | 502/400 |
| 7,846,869 B2 | 12/2010 | LaCour | | |
| 7,931,739 B2 | 4/2011 | Lacour | | |
| 2004/0178117 A1 | 9/2004 | Morton et al. | | |
| 2009/0311156 A1 | 12/2009 | Schmidt et al. | | |
| 2010/0062925 A1 | 3/2010 | Morton et al. | | |

FOREIGN PATENT DOCUMENTS

WO  WO/99/42214  8/1999

* cited by examiner

*Primary Examiner* — Duane Smith
*Assistant Examiner* — Christopher P Jones
(74) *Attorney, Agent, or Firm* — Hovey Williams LLP (57) ABSTRACT

A silicate-resistant sorbent composition, as well as a method of making and using the same, is provided. The sorbent composition generally comprises a support component comprising one or more silicate-resistant silica-containing components that have been treated one or more silicate-inhibiting metals. The inventors have discovered that sorbent compositions made and used according to embodiments the present invention exhibit a surprisingly low in situ silicate generation rate when exposed to oxidative regeneration conditions.

41 Claims, 3 Drawing Sheets

SILICATE-RESISTANT DESULFURIZATION SORBENT

BACKGROUND

1. Field of the Invention

This invention relates to desulfurization sorbents. In another aspect, this invention concerns methods of making and using a sorbent composition suitable for removing sulfur and sulfur-containing compounds from hydrocarbon streams.

2. Description of the Related Art

The increased global demand for cleaner burning fuels has driven the worldwide effort to reduce the sulfur levels in many hydrocarbon-based fuels, such as gasoline and diesel. Lower-sulfur fuel blends contribute to improved air quality by minimizing the adverse impact on emissions-regulating automotive components such as, for example, highly sulfur-sensitive catalytic converters. Automobiles operating with inefficient or poisoned catalytic converters emit exhaust containing high levels of non-combusted, heavier-than-methane hydrocarbons, nitrogen oxides (i.e., $NO_x$), sulfur oxides (i.e., $SO_x$), and carbon monoxide. Catalyzed by sunlight, these components react to form ground-level ozone, more commonly referred to as "smog."

In recent years, the public discussion regarding the reduction of sulfur levels in fuel blends has not focused on whether or not such a reduction should occur, but, rather, has centered on the required level of reduction, as well as the time frame for the implementation of corresponding regulations. Within the last several years, several countries, including China, the United States, Japan, India, Brazil, and the European Union have begun issuing mandates requiring progressively lower sulfur levels (e.g., some less than 10 ppmw) in automotive fuels, including both gasoline and diesel.

These stricter regulations have led oil refiners and other fuel producers/blenders to alter their current fuel production schemes to include processes for desulfurizing the hydrocarbon-containing streams used as blendstocks for producing different types of consumer fuels, including, for example, typical automotive gasolines and diesels, heavy equipment diesel fuels, racing gasolines, aviation gasolines, boat gasolines, and the like. Examples of hydrocarbon streams used as blendstocks to produce these fuels include, but are not limited to, thermally and/or catalytically processed gasolines such as, for example, thermally cracked gasoline, visbreaker gasoline, coker gasoline and catalytically cracked gasoline, which are sometimes collectively referred to as "cracked gasolines."

Many desulfurization processes and systems employ a catalyst or sorbent to chemically and/or physically remove sulfur-containing compounds from the hydrocarbon stream being desulfurized. Oftentimes, during operation of the desulfurization system, conditions may arise that contribute to the formation of one or more compounds into and/or onto the catalyst or sorbent that adversely affect its desulfurization activity. For example, when the sorbent or catalyst includes a silica-containing compound in association with a metal oxide compound, oxidative regeneration of the sorbent or catalyst can cause the formation of one or more silicates in, on, and/or within the sorbent or catalyst. Silicates are generally inert, but can occupy the active sites on the catalyst or sorbent, thereby reducing the desulfurization activity of the catalyst or sorbent. Because silicates cannot be removed by conventional oxidative regeneration methods, catalyst or sorbent that has been deactivated by the formation of silicates must generally be deinventoried from the desulfurization unit and completely replaced. To avoid the high operating and lost production costs associated with such a catalyst or sorbent replacement, refiners have long desired a method of minimizing the formation of silicates on desulfurization catalyst and/or sorbent.

SUMMARY

In one embodiment of the present invention, there is provided a sorbent composition. In one embodiment, the sorbent composition comprises the following elements: (a) a silica-containing component comprising a silicate-inhibiting metal selected from the group consisting of rare earth metals, alkaline earth metals, and combinations thereof; and (b) a substitutional solid solution comprising a promoter metal and zinc, wherein the silica-containing component has been impregnated with the silicate-inhibiting metal such that the silica-containing component comprises the silicate-inhibiting metal in an amount in the range of from about 0.5 to about 20 weight percent, wherein the silica-containing component comprises silicates in an amount less than 50 weight percent.

In another embodiment of the present invention, there is provided a sorbent composition comprising the calcined product of a physically bound mixture comprising (a) a silica-containing component comprising strontium in an amount in the range of from about 0.5 to about 20 weight percent; (b) zinc oxide; (c) an alumina-containing component; and (d) a promoter metal, wherein substantially all of the strontium present in said sorbent composition is concentrated in the silica-containing component.

In yet another embodiment of the present invention there is provided a method of making a sorbent composition. In one embodiment, the method comprises the following steps: (a) impregnating a silica-containing component with a silicate-inhibiting metal to thereby provide a silicate-resistant silica-containing component comprising at least 0.5 weight percent of the silicate-inhibiting metal wherein the silicate-inhibiting metal is selected from the group consisting of rare earth metals, alkaline earth metals, and combinations thereof and (b) combining the silicate-resistant silica-containing compound with zinc oxide and a promoter metal to thereby provide an unreduced sorbent composition.

In still another embodiment of the present invention there is provided a process for removing sulfur from a sulfur-containing hydrocarbon stream. In one embodiment, the process comprises the following steps: (a) contacting at least a portion of the hydrocarbon stream with a plurality of discrete sorbent particles in a desulfurization zone under desulfurization conditions to thereby provide a sulfur-depleted hydrocarbon stream and a plurality of sulfur-laden sorbent particles; and (b) regenerating at least a portion of the sulfur-laden sorbent particles in a regeneration zone under regeneration conditions to thereby provide a plurality of regenerated sorbent particles, wherein the sorbent particles comprise a silicate-resistant silica-containing component comprising in the range of from about 0.5 to about 20 weight percent of at least one silicate-inhibiting metal selected from the group consisting of rare earth metals, alkaline earth metals, and combinations thereof, wherein the desulfurization conditions include a hydrogen-to-hydrocarbon ratio in the range of from about 0.1:1 to about 50:1.

BRIEF DESCRIPTION OF THE DRAWINGS

Certain embodiments of the present invention are described in detail below with reference to the enclosed figures, in which like reference numerals are used to indicate like parts in the various views, wherein.

DETAILED DESCRIPTION

The inventors have recently discovered that, in general increased rates of silicate formation can be observed when catalysts or sorbents that include silica or a silica-containing component in association with a metal oxide component are exposed to high temperatures in the presence of water and/or oxygen. Although not wishing to be bound by theory, it is believed that the silicates are the result of a reaction between the metal oxide component and free silica in the catalyst or sorbent. Further, the presence of one or more sulfur-based acids (e.g., sulfuric and/or sulfurous acid) is believed to help promote the conversion of metal oxide to metal silicate in the presence of free silica. Since these conditions are typically present during the regeneration of a sulfur-laden sorbent or catalyst, in situ silicate formation is common in the regeneration zones of many types of desulfurization systems.

The inventors have found that when the metal oxide component of the sorbent or catalyst provides at least a portion of the active sulfur removal sites, the formation of a silicate into and/or onto the sorbent composition can substantially hinder its desulfurization activity. Although not wishing to be bound by theory, it is believed that by reacting with the free silica in the presence of water and/or oxygen, the formation of in situ silicate deprives the sorbent of its active desulfurization sites by reducing the amount of metal oxide available to chemically and/or physically adsorb and/or absorb sulfur compounds from the sulfur-containing hydrocarbon stream.

In one embodiment, the present invention is at least partially based on the discovery that incorporating at least one silicate-resistant silica-containing component into the sorbent composition unexpectedly reduces the in situ silicate generation rate, as well as the total silicate concentration of desulfurization sorbent after a given time-on-stream (TOS). In one embodiment, the silicate-resistant silica-containing component can comprise one or more silicate-inhibiting metals incorporated in, on, and/or within the silica-containing component. Although not wishing to be bound by theory, it has been hypothesized that the silicate-inhibiting metal preferentially associates with any free silica in the silica-containing component, thereby forming a "barrier" layer that prevents the metal oxide component of the sorbent composition from reacting with any free silica to form an undesirable silicate. Because the barrier layer is inert it does not inhibit the desulfurization ability of the sorbent and, accordingly, the silicate-resistant sorbent is able to maintain its desulfurization activity while exhibiting a substantially slower in situ silicate formation rate. Sorbent compositions as well as methods of making and using the sorbent according to one or more embodiments of the present invention are discussed in detail below.

In one embodiment of the present invention, a sorbent composition suitable for removing sulfur from a hydrocarbon stream is provided. In general, the sorbent composition can comprise a support component and a promoter metal component. According to one embodiment of the present invention, the support component comprises at least one silicate-resistant silica-containing component, as discussed in detail shortly.

Generally, the support component may be any component or combination of components which can be used as a support for the sorbent composition in order to help promote the desulfurization of a hydrocarbon stream. The support component can be a substantially inert or a substantially active element of the sorbent composition. The support component can comprise one or more inorganic and/or organic carrier components and, in one embodiment, can comprise a zinc component, an alumina-containing component, and a silica-containing component.

In general, the zinc component can be any zinc-containing compound. In one embodiment, the zinc component can be zinc oxide and/or one or more zinc compounds that are convertible to zinc oxide. Examples of suitable zinc compounds can include, but are not limited to, zinc sulfide, zinc sulfate, zinc hydroxide, zinc carbonate, zinc acetate, zinc nitrate, and combinations thereof. In one embodiment, the zinc component can comprise powdered zinc oxide.

The alumina-containing component can be any alumina-containing carrier compound. Generally, the alumina-containing component used in preparing a sorbent composition according to one embodiment of the present invention can be any suitable commercially available alumina material, such as, for example, colloidal alumina solutions, hydrated aluminas, and/or alumina compounds produced by the dehydration of alumina hydrates. In one embodiment, the alumina-containing component can comprise one or more hydrated aluminas such as boehmite and/or psuedoboehmite.

In general, the silica-containing component can be any suitable silica-containing compound. Examples of suitable silica-containing components can include, but are not limited to, diatomite, silicalite, silica colloid, flame-hydrolyzed silica, hydrolyzed silica, silica gel, precipitated silica, and combinations thereof. In another embodiment, the silica-containing component can comprise one or more compounds that are convertible to silica, such as silicic acid, and ammonium silicate. In one embodiment, the silica-containing component can comprise diatomite.

In another embodiment, the silica-containing component can comprise expanded perlite formed from a siliceous volcanic rock (i.e., crude perlite) that has been heated to a temperature above about 870° C. (1,598° F.) to thereby cause expansion of the rock to a size that is at least four times its initial size. Crude perlite rock expands (typically four to 20 times its original size) at high temperatures due to the presence of water in the rock. When the crude perlite is heated above about 870° C. (1,598° F.), the water in the rock vaporizes and creates numerous tiny bubbles in the heat-softened glassy particles. These diminutive glass-sealed bubbles are then crushed into curved pieces which account for the low density of expanded perlite. Expanded perlite typically has a density in the range of from about one to about 15 pounds per cubic foot or two to six pounds per cubic foot. An elemental analysis of expanded perlite typically shows the following components in approximately the following amounts: 33.8 percent silicon; 7.2 percent aluminum; 3.5 percent potassium; 3.4 percent sodium; 0.6 percent iron; 0.6 percent calcium; 0.2 percent magnesium; 47.5 percent oxygen (by difference); and 3.0 percent bound water. In one embodiment, the perlite employed in the present invention comprises the above-listed components in amounts within about 25 percent, within about 20 percent, or within 10 percent of the above-listed amounts.

The expanded perlite can be subjected to crushing or milling to reduce the particle size of the perlite prior use in the sorbent composition according to one embodiment of the present invention. When the silica-containing component comprises perlite, the perlite can have a mean particle size in the range of from about 5 to about 75 microns, about 20 to about 50 microns, or 30 to 40 microns. In one embodiment, the amount of the perlite having a particle size of more than 75 microns can be less than about 30 weight percent, less than about 15 weight percent, or less than 5 weight percent, based on the total weight of perlite employed. In another embodiment, the amount of the perlite having a particle size of less than 2 microns can be less than about 30 weight percent, less than about 15 weight percent, or less than 5 weight percent, based on the total weight of perlite employed.

In one embodiment, the silica-containing component can comprise a free-silica silica-containing component. As discussed previously, while not wishing to be bound by theory, the inventors have found that when a metal oxide component (e.g., zinc oxide) of the sorbent or catalyst provides at least a portion of the active desulfurization sites, the reaction of any free silica with the metal oxide, in the presence of water and/or oxygen, results in the formation of in situ silicate (e.g., zinc silicate), which can substantially reduce the desulfurization ability of the sorbent composition. Thus, in one embodiment, the sorbent composition can comprise less than about 10 weight percent, less than about 5 weight percent, less than about 3 weight percent, less than about 1 weight percent, less than about 0.5 weight percent, less than about 0.25 weight percent, less than about 0.025 weight percent, or less than about 0.01 weight percent of one or more bound-silica silica-containing components, based on the total weight of the sorbent composition. In another embodiment, the sorbent composition can be substantially free of one or more bound-silica silica-containing components. Examples of bound-silica silica-containing components can include, but are not limited to, aluminosilicates, including, for example, both naturally occurring and synthetic zeolites, and mole sieves. Aluminosilicates, which typically comprise silicate anions bound by one or more types of metal cations, are generally incapable of releasing free silica under the operating conditions according to the present invention.

In one embodiment, the silica-containing component can comprise, consist essentially of, or consist of a silicate-resistant silica-containing component. In accordance with one embodiment of the present invention, the silicate-resistant silica-containing component can be prepared by contacting the silica-containing component with one or more silicate-inhibiting metals selected from the group consisting of alkaline earth metals, rare earth metals, or combinations thereof. In one embodiment, the silicate-inhibiting metals can be selected from the group consisting of strontium, barium, lanthanum, or combinations thereof. In general, the silicate-resistant silica-containing component can comprise at least about 50 weight percent, at least about 75 weight percent, at least about 85 weight percent, at least about 90 weight percent, or at least 95 weight percent of the silica-containing component, based on the total weight of the silica-containing component. In another embodiment, the silicate-resistant silica-containing component can comprise substantially all of the silica-containing component. Further details regarding the preparation of a silicate-resistant silica-containing component, according to one embodiment of the present invention, will be discussed in detail shortly.

In addition to the support component, the desulfurization sorbent of the present invention can also comprise a promoter metal component. In general, the promoter metal component of the sorbent composition can be any component added to the sorbent composition that helps promote desulfurization. In one embodiment, the promoter metal component can comprise a promoter metal selected from the group consisting of nickel, cobalt, iron, manganese, copper, zinc, molybdenum, tungsten, silver, tine, antimony, vanadium, and combinations thereof. In one embodiment, the promoter metal can comprise nickel. In another embodiment, the promoter metal component can comprise a promoter metal-containing compound. Examples of suitable promoter metal-containing compounds can include, but are not limited to, metal acetates, metal carbonates, metal nitrates, metal sulfates, metal thiocyanates, the like, and combinations thereof.

Table 1, below, summarizes the composition of a desulfurization sorbent composition in accordance with one embodiment of the present invention. All weight percentages in Table 1, below, are based on the total weight of the physically bound sorbent composition.

TABLE 1

Components of Sorbent Composition

| Component | Broad, wt % | Intermediate, wt % | Narrow, wt % |
|---|---|---|---|
| Zinc Component | 10 to 90 | 15 to 60 | 20 to 55 |
| Alumina-containing component | 1 to 30 | 5 to 20 | 5 to 15 |
| Silicate-Resistant Silica-Containing Component | 5 to 85 | 10 to 60 | 15 to 55 |
| Promoter Metal | 1 to 60 | 5 to 50 | 10 to 40 |

According to another embodiment of the present invention, there is provided a method of making a sorbent composition as discussed above. In general, the manufacture of a sorbent composition according to one embodiment of the present invention generally includes the steps of (a) incorporating a silicate-inhibiting metal into a first silica-containing component to thereby provide a silicate-resistant silica-containing component; and (b) combining the silicate-resistant silica-containing component with one or more additional support components and a promoter metal component to thereby provide a sorbent composition.

In one embodiment of the present invention, the step of combining the silicate-resistant silica-containing component with one or more additional support components and a promoter metal component can further comprise one or more of the following substeps: (b1) admixing a plurality of sorbent components to thereby provide a support admixture; (b2) particulating at least a portion of the admixture to thereby provide a plurality of particulates; (b3) drying at least a portion of the particulates to thereby provide dried particulates; (b4) calcining at least a portion of the dried particulates to thereby provide dried, calcined particulates; (b5) incorporating a promoter metal component to thereby provide a plurality of unreduced promoted particulates; (b6) calcining the unreduced promoted particulates to thereby provide a plurality of calcined promoted particulates; and (b7) optionally, reducing at least a portion of the unreduced particulates to provide a plurality of reduced particulates. Specific details associated with each of these steps and substeps, according to one or more embodiments of the present invention, will now be discussed in detail below.

In one embodiment, a sorbent composition according to one embodiment of the present invention can be prepared by first preparing a silicate-resistant silica-containing component. In general, the silicate-resistant silica-containing component can be prepared by incorporating a silicate-inhibiting metal into and/or onto a silica-containing component. Typically, the step of incorporating a silicate-inhibiting metal can be carried out by any suitable means or method known in the art. For example, in one embodiment, the silica-containing component can be contacted with an aqueous solution of the silicate-inhibiting metal via soaking, spraying, or any combination thereof. In another embodiment, the silicate-inhibiting metal can be impregnated into and/or onto the silica-containing component using incipient wetness impregnation techniques. When impregnation is used, an aqueous impregnation solution comprising the desired concentration of silicate-inhibiting metal or precursor thereto can be contacted with the silica-containing component for a time period in the range of from about 10 seconds to about 60 minutes, about 30 seconds to about 20 minutes, or 1 minute to 15 minutes.

According to one embodiment, the resulting silicate-resistant silica-containing component can comprise in the range of from about 0.5 to about 20 weight percent, about 0.75 to about 15 weight percent, or 1 to 10 weight percent of one or more silicate-inhibiting metals, based on the total weight of the silicate-resistant component. In another embodiment, because substantially all of the silicate-inhibiting metal can be concentrated in the silicate-resistant component the overall sorbent composition can comprise a relatively low concentration of silicate-inhibiting metal. For example, according to one embodiment, the overall sorbent composition can comprise less than about 5 weight percent, less than about 2 weight percent, less than 1 weight percent, less than about 0.5 weight percent, or less than 0.1 weight percent of one or more silicate-inhibiting metals, based on the total weight oil the sorbent composition. In another embodiment, the sorbent composition can comprise in the range of from about 0.01 to about 10, about 0.025 to about 5, or 0.0375 to 2 weight percent of one or more silicate-inhibiting metals, based on the total weight of the sorbent composition.

Once a sufficient amount of silicate-inhibiting metal solution has been incorporated into and/or onto the silica-containing compound, the impregnated silica-containing component can then be dried at a temperature in the range of from about 60° C. (140° F.) to a bout 110° C. (230° F.), about 70° C. (158° F.) to about 105° C. (221° F.), or 80 (176° F.) to about 100° C. (212° F.) for a time period in the range of from about 30 minutes to about 12 hours, about 1 hour to about 8 hours, or 2 to 6 hours. The drying can be carried out at or near atmospheric pressure or under a slight vacuum. The resulting dried, impregnated silica-containing component can then be calcined at a temperature in the range of from about 450° C. (842° F.) to about 950° C. (1,742° F.), about 500° C. (932° F.) to about 900° C. (1,652° F.), or 575° C. (1,067° F.) to 825° C. (1,517° F.) for a period of time in the range of from about 1 to about 20 hours, about 2 to about 15 hours, or 5 to 10 hours.

During calcination, the inventors have discovered that a substantial portion of the silicate-inhibiting metal incorporated into the silica-containing component unexpectedly forms a generally non-crystalline association with the silica-containing component. In one embodiment, at least about 55 weight percent, at least about 65 weight percent, at least 75 weight percent at least 85 weight percent, at least about 95 weight percent, or substantially all of the silicate-inhibiting metal can form a generally non-crystalline association with the silica-containing component. In addition, in direct contrast to what one skilled in the art may expect, the calcined silicate-resistant silica-containing component comprises a surprisingly low silicate content. In one embodiment, the silicate-resistant silica-containing component can comprise less than about 50 weight percent, less than about 25 weight percent, less than about 10 weight percent, less than about 5 weight percent, less than about 1 weight percent of one or more silicates, while in another embodiment, the silicate-resistant component can comprise substantially no silicates.

In one embodiment, the resulting silicate-resistant silica-containing component can then be combined with one or more additional support components and a promoter metal component to thereby provide an unreduced sorbent composition. In one embodiment, the support component(s) and promoter metal component can be combined in a single step, while in another embodiment, the promoter metal component can be combined with the support component in a multi-step process. Suitable methods of combining the support component(s) and promoter metal component, according to one or more embodiments of the present invention, will now be discussed in detail below.

According to one embodiment, the support component can be prepared by admixing one or more support components, such as, for example, a zinc component and an alumina-containing component, with the silicate-resistant silica-containing component to thereby form a support component admixture. Optionally, at least a portion or substantially all of the promoter metal can also be incorporated into the support component admixture at this time. Alternatively, the promoter metal may be incorporated onto, into, or within a pre-formed support component, as discussed in detail shortly. The support components and optional promoter metal component can be combined according to any known and suitable method or devices in the art. Examples of suitable mixing methods and devices can include, but are not limited to, mixing tumblers, stationary shells or troughs, batch or continuous Muller mixers, impact mixers, and the like.

The resulting admixture can be in the form of a wet mix, a dough, a paste, a slurry, or the like. In one embodiment wherein the support admixture comprises a zinc component, an alumina-containing component, and a silica-containing component, the support admixture can comprise zinc in an amount in the range of from about 2 to about 70 weight percent, about 5 to about 50 weight percent, or 10 to 45 weight percent. The alumina-containing component can be present in the support admixture in an amount such that the weight ratio of the zinc component to the alumina-containing component is in the range of from about 0.1:1 to about 20:1, about 1:1 to about 10:1, or about 2:1 to 6:1. In one embodiment, the silicate-resistant silica-containing component can be present in the support admixture in an amount such that the weight ratio of the zinc component to the silicate-resistant silica-containing component is in the range of from about 0.5:1 to 20:1 about 1:1 to about 10:1, or 2:1 to 6:1.

According to one embodiment, a solvent may be incorporated into the support admixture to help form a support mixture having an optimum consistency for shaping. In one embodiment, the solvent can comprise distilled water and can be added to the support admixture in an amount sufficient to create a substantially homogeneous slurry. In one embodiment, the solvent can be present in an amount such that the weight ratio of the zinc component to the solvent is in the range of from about 0.05:1 to about 2:1, about 0.1:1 to about 1.5:1, or 0.2:1 to 1:1.

In addition, one or more optional fillers can be added to the support admixture to enhance the ability of the support admixture to be shaped. In one embodiment, the filler can comprise a clay, such as, for example, attapulgus clay, china clay, kaolin clay, or combinations thereof. In one embodiment, the filler can comprise kaolin clay. According to one embodiment of the present invention, when the filler comprises at least about 25 weight percent, at least about 30 weight percent, or at least about 35 weight percent of silica or a silica-containing compound, one or more silicate-inhibiting metals can also be incorporated into the silica-containing filler, using one or more methods described above, thereby providing a silicate-resistant filler (e.g., a second silicate-resistant silica-containing component). Typically, the silica-containing filler can be contacted with the silicate-inhibiting metal prior to being incorporated into the support admixture in a similar manner as previously described above. According to one embodiment, the resulting silicate-resistant silica-containing component can comprise in the range of from about 0.5 to about 20 weight percent, about 0.75 to about 15 weight percent, or 1 to 10 weight percent of one or more silicate-inhibiting metals, based on the total weight of the silicate-resistant silica-containing filler.

The resulting support admixture, which can comprise a zinc component, an alumina-containing component, a silicate-resistant silica-containing component, and an optional silicate-resistant filler, can then be shaped into one or more desired particulate shapes and/or sizes. Examples of suitable particulate shapes, can include, but are not limited to, granulates, extrudates, tablets, spheres, pellets, microspheres, and the like. In addition, shapes such as rings, monoliths, trilobes, and wagon wheels have also been contemplated. In general, the specific particulation method employed generally depends on the physical form of the admixture and the specific configuration of the desulfurization system in which the sorbent composition will ultimately be employed.

For example, in one embodiment, when the physically-bound support admixture is in the form of a wet mix, the admixture can be shaped through granulation to thereby form a plurality of granulates. Once the granulates have been dried, calcined, and otherwise processed, as discussed in detail below, the granulates can be further ground or otherwise pulverized to form granulates of a desired particle size. When the support admixture is in the form of a dough or paste, the resulting admixture can be shaped via extrusion to thereby form a plurality of extrudates. In one embodiment, the generally cylindrical extrudates can typically be of any suitable length and generally can have a diameter in the range of from about 0.03125 inches to about 1.5 inches inch or 0.125 inches to about 1 inch. In general, granulates and extrudates can be typically be employed in a fixed or semi-fixed bed desulfurization process.

In one embodiment, when the support admixture is in the form of a slurry, the support admixture can be particulated via spray drying. Spray drying is known in the art and is discussed in *Perry's Chemical Engineers' Handbook*, Sixth Edition, published by McGraw-Hill, Inc., at pages 20-54 through 20-58. Additional information can be obtained from the *Handbook of Industrial Drying*, published by Marcel Dekker. Inc., at pages 243 through 293. According to one embodiment, the resulting spray-dried particulates can be microspheres having a mean particle size in the range of from about 10 to about 300 microns, about 40 to about 150 microns, or 50 to 100 microns, as determined by using a using a RO-TAP Testing Sieve-Shaker, manufactured by W. S. Tyler, Inc. of Mentor, Ohio, or other comparable sieves. To determine mean particle size, the material to be measured is placed in the top of a nest of standard 8 inch diameter stainless steel framed sieves with a pan on the bottom. The material undergoes sifting for a period of about 10 minutes; thereafter, the material retained on each sieve is weighed. The percent retained on each sieve is calculated by dividing the weight of the material retained on a particular sieve by the weight of the original sample. This information is used to compute the mean particle size, by the method outlined in Chapter 3 of *Fluidization Engineering* by Kunii and Levenspiel (1987). Typically, microspheres as described above can be employed in a fluidized or semi-fluidized bed desulfurization process.

After the support admixture has been particulated, the resulting support particulates can then be dried to thereby form a plurality of dried support particulates. Any drying method(s) known in the art, such as, for example, air drying, heat drying, vacuum drying, and combinations thereof can be used. In one embodiment, the support particulates can then be dried at a temperature in the range of from about 80° C. (176° F.) to about 145° C. (293° F.), about 85° C. (185° F.) to about 140° C. (284° F.), or 90° C. (194° F.) to for a time period in the range of from about 0.5 to about 60 hours, about 1 to about 40 hours, or 1.5 to 20 hours. Typically, the drying can be carried out at a pressure in the range of from about atmospheric to about 690 kPa (100 psia) or atmospheric to about 1,035 kPa (150 psia). Any suitable period for drying the support particulates can be employed. In one embodiment, the support particulates can be dried for a period in the range of from about 0.5 to about 60 hours, about 1 to about 30 hours, or 2 to 20 hours.

The resulting dried support particulates can then be calcined under cacining conditions sufficient to remove a major portion of the residual water and/or to oxidize any combustibles, thereby providing, a plurality of dried, calcined support particulates. In one embodiment, the calcining conditions can include a temperature in the range of from about 200° C. (392° F.) to about 985° C. (1,805° F.), about 315° C. (599° F.) to about 875° C. (1,607° F.), or 425° C. (797° C.) to 820° C. (1,508° F.) for a time period of about 1 to about 60 hours, about 2 to about 20 hours, or 2 to 15 hours. The calcining conditions can also include a pressure in the range of from about 50 kPa (7.25 psia) to about 5,175 kPa (750.6 psia), about 50 kPa (7.25 psia) to about 3,100 kPa (449.6 psia), or 50 kPa (7.25 psia) to 1,035 kPa (150.1 psia).

During calcination of the support particulates, at least a portion of the zinc component and at least a portion of the alumina-containing component can chemically combine to form a spinal structure similar to zinc aluminate ($ZnAl_2O_4$). The zinc aluminate component may not be stoichiometrically pure. Table 2, below summarizes the broad, intermediate, and narrow ranges for each component in the calcined, physically-bound support admixture, according to one embodiment of the present invention. All weight percentages in Table 2, below, are based on the total weight of the calcined support component.

TABLE 2

Components of Calcined Support Component

| Component | Broad, wt % | Intermediate, wt % | Narrow, wt % |
| --- | --- | --- | --- |
| Zinc Aluminate | 2 to 40 | 5 to 30 | 10 to 20 |
| Zinc Oxide | 20 to 95 | 40 to 90 | 60 to 80 |
| Silicate-Resistant Silica-Containing Component | 2 to 50 | 5 to 30 | 10 to 20 |
| Alumina-Containing Component | 0.5 to 15 | 1 to 10 | 2 to 6 |

According to one embodiment of the present invention, the resulting dried, calcined support particulate can then be contacted with a promoter metal component to thereby incorporate at least a portion of the promoter metal component into and/or onto the dried, calcined support component. In one embodiment, the promoter metal component can comprise at least one metal, metal oxide, or a precursor thereto. Typically, the promoter metal component may be incorporated into and/or onto the calcined support particulates by any suitable means or method known in the art such as, for example, soaking, spraying, and combinations thereof. In one embodiment, the promoter metal component can be incorporated into the calcined support particulate via standard incipient wetness impregnation techniques. In general, the impregnation method can employ an impregnation solution comprising the desired concentration of the promoter metal dissolved in a suitable solvent, such as, for example distilled water. A slightly acidic solution may be used in order to aid in the dissolution of the promoter metal component in the solvent. According to one embodiment, the calcined support particulates can be impregnated with a solution comprising nickel hexahydrate dissolved in distilled water. Generally, the amount of the promoter metal incorporated onto, into or within the calcined support particulates, can be an amount that ultimately provides a promoted sorbent composition having a promoter metal component in an amount in the range provided in Table 1, above.

Once the promoter metal has been incorporated on, in, or with the calcined support particulates, the promoted sorbent particulates can then be dried and calcined to thereby provide a plurality of calcined promoted sorbent particulates. The drying and calcining of the promoted sorbent particulates can be accomplished by any suitable method(s) known in the art. In one embodiment, the drying and calcining of the promoted sorbent particulates is performed in substantially the same manner and under substantially the same conditions as previously described with reference to the drying and calcining of the unpromoted support particulates.

When the promoted sorbent particulates are calcined, at least a portion of the promoter metal and at least a portion of the zinc oxide present in the promoted sorbent composition can chemically combine to form an oxidized promoter metal component. The oxidized promoter metal component can comprise, consist essentially of, or consist of a substitutional solid metal oxide solution characterized by the formula: $M_xZn_yO$, wherein M is the promoter metal and X and Y are each numerical values in the range of from about 0.01 to about 0.99. In the above formula, X can be in the range of from about 0.5 to about 0.9 or 0.6 to 0.8. In one embodiment, Y can be in the range of from about 0.1 to about 0.5, or 0.2 to 0.4. In one embodiment, X+Y=1.

Substitutional solid solutions have unique physical and chemical properties that are important to the chemistry of the sorbent composition described herein. Substitutional solid solutions are a subset of alloys that are formed by the direct substitution of the solute metal for the solvent metal atoms in the crystal structure. For example, it is believed that the substitutional solid metal oxide solution ($M_xZn_yO$) found in the oxidized (i.e., unreduced), calcined sorbent composition made by the process of the present invention is formed by the solute zinc metal atoms substituting for the solvent promoter metal atoms. There are three basic criteria that favor the formation of substitutional solid solutions: (1) the atomic radii of the two elements are within 15 percent of each other; (2) the crystal structures of the two pure phases are the same; and (3) the electro negativities of the two components are similar. The promoter metal (as the elemental metal or metal oxide) and zinc oxide employed in the inventive sorbent composition preferably meet at least two of the three criteria set forth above. For example, when the promoter metal is nickel, the first and third criteria, are met, but the second is not. The nickel and zinc metal atomic radii are within 10 percent of each other and the electro negativities are similar. However, nickel oxide (NiO) preferentially forms a cubic crystal structure, while zinc oxide (ZnO) prefers a hexagonal crystal structure. A nickel zinc oxide solid solution retains the cubic structure of the nickel oxide. Forcing the zinc oxide to reside in the cubic structure increases the energy of the phase, which limits the amount of zinc that can be dissolved in the nickel oxide structure. This stoichiometry control manifests itself microscopically in a 70:30 nickel zinc oxide solid solution ($Ni_{0.7}Zn_{0.3}O$) that can be formed during oxidation (i.e., calcination or regeneration) and microscopically in the repeated regenerability of the sorbent.

In addition, during calcination of the promoted sorbent particulates, at least a portion of the promoter metal can combine with at least a portion of the zinc aluminate to form a promoter metal-zinc aluminate substitutional solid solution characterized by the formula $M_ZZn_{(1-Z)}AL_2O_4$, wherein Z is a numerical value in the range of from about 0.01 to about 0.99.

In one embodiment, the calcined promoted sorbent particulates comprise zinc oxide, the oxidized metal component $M_xZn_yO$, the silicate-resistant silica-containing component, and the promoter metal-zinc aluminate component $M_ZZn_{(1-Z)}AL_2O_4$ in amounts provided in Table 3 below. All weight percentages in Table 3, below, are based on the total weight of the calcined promoted sorbent composition.

TABLE 3

Components of Calcined Promoted Sorbent Particulates

| Component | Broad, wt % | Intermediate, wt % | Narrow, wt % |
|---|---|---|---|
| ZnO | 5 to 80 | 20 to 60 | 30 to 50 |
| $M_xZn_yO$ | 5 to 70 | 15 to 60 | 20 to 40 |
| $M_ZZn_{(1-Z)}Al_2O_4$ | 1 to 50 | 5 to 30 | 10 to 20 |
| Silicate-Resistant Silica-Containing Component | 5 to 50 | 10 to 40 | 15 to 30 |

Although discussed above with reference to one embodiment wherein the silicate-resistant silica-containing component is prepared prior to incorporation into the support component, variations of this method have also been contemplated. For example, in one embodiment, the support component can be prepared as discussed above and at least a portion, with at least a portion of the silicate-inhibiting metals being incorporated into the dried, calcined support component prior to incorporation of the promoter metal or promoter metal component. In another embodiment, at least a portion of the silicate-inhibiting metals can be incorporated subsequent to the promoter metal onto the calcined, promoted sorbent particulates.

In one embodiment, incorporating a silicate-resistant silica-containing component into the support composition, as described above, may be preferable to one or more of alternative embodiments because, for example, preparing the silicate-resistant silica-containing component as described above results in a final support and/or sorbent composition wherein substantially all of the silicate-inhibiting metals are concentrated in the silica-containing component. According to one embodiment, when the sorbent composition is prepared as described above, at least about 75 weight percent, at least about 80 weight percent, at least about 90 weight percent, or at least 95 weight percent of the total amount of silicate-inhibiting metals in the sorbent composition can be concentrated in the silica-containing component. In contrast, when the silicate-inhibiting metal(s) are incorporated into the support component and/or sorbent composition as a whole, less than about 35 weight percent, less than about 25 weight percent, or less than 10 weight percent of the silicate-inhibiting metals are concentrated in the silica-containing component. Because the free silica in the silica-containing component has been posited as being a key contributor to the formation of one or more types of silicate into and/or onto the sorbent composition, incorporating the silicate-inhibiting metals into the silica-containing component prior to including the silica-containing component in the support or sorbent composition may be advantageous in certain circumstances.

After calcination of the promoted sorbent particles, the resulting dried, calcined promoted sorbent particles can be subjected to reduction with a suitable reducing agent, such as, for example, hydrogen, under reducing conditions to thereby provide a reduced sorbent composition. In one embodiment, the reducing conditions can include a temperature in the range of from about 35° C. (95° F.) to about 815° C. (1,499° F.) and a pressure in the range of from about 100 kPa (14.5 psia) to about 10,300 kPa (1,494 psia). Typically, the reduction can be carried out for a period of time in the range of from about 0.1 to about 20 hours, about 0.25 to about 15 hours, or 0.5 to 10 hours.

During reduction of the calcined promoted sorbent particulates, at least a portion of the oxidized promoter metal component can be reduced to thereby provide a reduced-valence promoter metal component. In general, a reduced-valence promoter metal component has no oxygen atoms associated with it. In one embodiment, the reduced-valence promoter metal component can comprise, can consist of, or can consist essentially of, a substitutional solid metal solution characterized by the formula: $M_A Zn_B$, wherein M is the promoter metal and A and B are numerical values in the range of from about 0.01 to 0.99. According to one embodiment, A can be in the range of from about 0.70 to about 0.97, about 0.80 to about 0.95, or 0.90 to 0.94, while B can be in the range of from about 0.03 to about 0.30, about 0.05 to about 0.20, or about 0.06 to about 0.10. In one embodiment, B equals (1-A).

In one embodiment, the reduced sorbent composition can comprise zinc oxide, the reduced-valence promoter metal component $M_A Zn_B$, the silicate-resistant silica component, and the promoter metal-zinc aluminate substitutional solid solution $M_Z Zn_{(1-Z)} AL_2 O_4$ in the amounts summarized in Table 4, below. All weight percentages in Table 4, below, are based on the total weight of the reduced sorbent particulates.

TABLE 4

Components of Reduced Sorbent Particulates

| Component | 1 Broad, wt % | Intermediate, wt % | Narrow, wt % |
|---|---|---|---|
| ZnO | 5 to 80 | 20 to 60 | 30 to 50 |
| $M_A Zn_B$ | 5 to 80 | 20 to 60 | 30 to 40 |
| $M_Z Zn_{(1-Z)} AL_2 O_4$ | 1 to 50 | 5 to 30 | 10 to 20 |
| Silicate-Resistant Silica-Containing Component | 5 to 50 | 10 to 40 | 20 to 30 |

In general, the physical properties of the reduced sorbent particulates can affect the suitability for its use in a desulfurization process, one embodiment of which will be described in detail shortly. In one embodiment, the reduced or unreduced sorbent particulates can comprise substantially microspherical particles having a mean particle size in the range of from about 10 to about 300 microns, about 40 to 150 microns, or 50 to 100 microns. In another embodiment, the density of the sorbent particulates can be in the range of from about 0.5 to about 1.5 grams per cubic centimeter (g/cc), about 0.8 to about 1.3 g/cc, or 0.9 to 1.2 g/cc. In one embodiment, the particle size and density of the sorbent particulates may qualify the sorbent particulates as a Group A solid under the Geldart group classification system described in *Powder Technology*, 7, 285-292 (1973).

Figure 1:
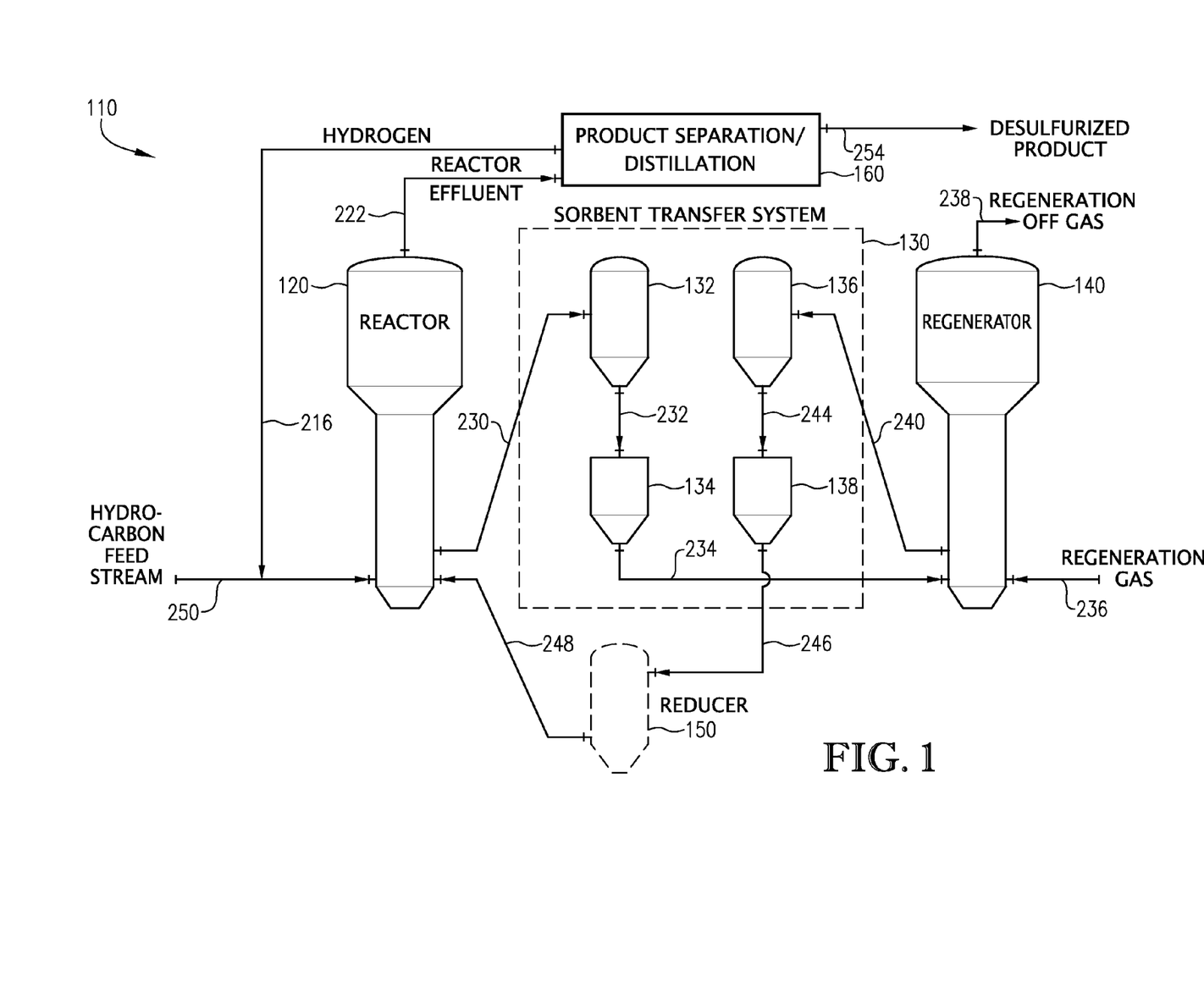
FIG. 1 is a schematic process flow diagram of a desulfurization system configured according to one embodiment of the present invention that employs a plurality of desulfurization sorbent particles.

Referring now to FIG. 1, a desulfurization system 110, configured according to one embodiment of the present invention, is illustrated. In general, desulfurization system 110 can be any system capable of at least partially desulfurizing a sulfur-containing hydrocarbon feed stream using a plurality of fluidizable, circulatable solid sorbent particles as described above. The main components of desulfurization system 110 illustrated in FIG. 1 include a reaction vessel (i.e., a reactor) 120, a sorbent transfer system 130, a regeneration vessel (i.e., a regenerator) 140, an optional reduction vessel (i.e., reducer 150), and a product separation/distillation zone 160.

Reactor 120, regenerator 140, and/or reducer 150 can comprise any vessel from which solid sorbent particles can be added or withdrawn in a batch, semi-batch, semi-continuous, or continuous manner. In general, reactor 120, regenerator 140, and/or reducer 150 can comprise a fluidized particle bed (i.e., a fluidized bed vessel), a fixed particle bed (i.e., a fixed bed vessel), or any combination thereof (i.e., a hybrid vessel). In one embodiment, reactor 120, regenerator 140, and reducer 150 each comprise fluidized particle beds.

Sorbent transfer system 130 can comprise any suitable mechanism to transfer at least a portion of the solid sorbent particles employed in desulfurization system 110 between reactor 120, regenerator 140, and/or reducer 150. In one embodiment illustrated in FIG. 1, sorbent transfer system 130 can comprise a reactor receiving vessel (i.e., receiver) 132, a reactor-side transfer/stripping vessel 134, a regenerator receiving vessel (i.e., receiver) 136, and a regenerator-side transfer/stripping vessel 138.

Product separation/distillation zone 160 can employ any process scheme and/or comprise any equipment required to further process the desulfurized product stream exiting reactor 120 in order to achieve one or more desired product specifications. In one embodiment, product separation/distillation zone 160 can comprise at least one separation vessel or column (not shown) operable to remove relatively more volatile materials (i.e., hydrogen, nitrogen, methane, ethane, and the like) from the relatively less volatile desulfurized hydrocarbon material. In addition, product separation/distillation zone 160 can comprise any number and configuration of heat exchangers and other similar equipment as known in the art (not shown) in order to produce a desulfurized product stream having the desired temperature and/or vapor fraction.

In operation, a sulfur-containing hydrocarbon stream in conduit 250 can be introduced into a desulfurization zone which is at least partially defined within desulfurization reactor 120, wherein the hydrocarbon stream can be at least partially desulfurized under desulfurization conditions via contact with a plurality of solid sorbent particles.

In one embodiment of the present invention, the sulfur-containing feed stream in conduit 250 can comprise gasoline, diesel, or a combination thereof. Gasoline typically comprises a mixture of hydrocarbons having a boiling point in the range of from about 35° C. (95° F.) to about 260° C. (500° F.). In general, gasolines comprise in the range of from about 5 to about 50 weight percent about 10 to about 35 weight percent, or 15 to 25 weight percent of olefins and/or in about 10 to about 55, about 15 to about 45 weight percent, or 20 to 40 weight percent aromatics, based on the total weight of the gasoline stream. Examples of gasolines include, but are not limited to, naphthas such as straight-naphtha, coker naphtha, catalytic gasoline, visbreaker naphtha, alkylate, isomerate, and reformate and/or catalytically- or thermally-cracked gasolines such as coker gasoline, visbreaker gasoline, fluidized catalytic cracker (FCC) gasoline, heavy oil cracker (HOC) gasoline, hydrocracker gasoline. Diesel fuel can generally be characterized as having a boiling point in the range of from about 150° C. (302° F.) to about 400° C. (752° F.), and generally comprises in the range of from about 10 to about 90 weight percent, about 20 to about 80 weight percent, or 15 to 60 weight percent aromatics and/or less than about 10 weight percent, less than about 5 weight percent, or substantially no olefins. Examples of diesel fuels can include, but are not limited to, light cycle oil, kerosene, jet fuel, straight-run diesel, hydrotreated diesel, and combinations thereof. In one embodiment, the gasoline and/or diesel fuel in conduit 250 may have previously been fractionated and/or hydrotreated in an upstream unit (not shown) prior to entering reactor 120.

In one embodiment of the present invention, the hydrocarbon feed stream in conduit 250 can comprise one or more sulfur-containing compounds, which can include, but are not limited to, hydrogen sulfide ($H_2S$), carbonyl sulfide (COS), carbon disulfide ($CS_2$), mercaptans (RSH), organic sulfides (R—S—R), organic disulfides (R—S—S—R), thiophene, substituted thiophenes, organic trisulfides, organic tetrasulfides, benzothiophene, alkyl thiophenes, alkyl benzothiophenes, alkyl dibenzothliophenes, and combinations thereof. In general, R can be an alkyl, cycloalkyl, or aryl group comprising in the range of from about 1 to about 15 carbon atoms. In another embodiment, at least about 50 weight percent, at least about 75 weight percent, or at least about 90 weight percent of the total mass of atomic sulfur in the sulfur-containing hydrocarbon feed stream in conduit 250 can comprise organosulfur compounds. In one embodiment, the feed stream in conduit 602 can have a sulfur content greater than about 50 parts per million by weight (ppmw), or in the range of from about 100 to about 10,000 ppmw, about 150 to about 5,000 ppmw, based on the total weight of the stream. Sulfur content refers to the amount of atomic sulfur in the sulfur-containing compounds and can be determined according to various ASTM standard methods, including, for example, ASTM D-2622-08 *Standard Test Method for Sulfur in Petroleum Products by Wavelength Dispersive X-ray Fluorescence Spectrometry*.

The solid sorbent particles contacted with the sulfur-containing hydrocarbon stream in reactor 120 can be any sufficiently fluidizable, circulatable, and regenerable sorbent composition having sufficient desulfurization activity and sufficient attrition resistance at the desulfurization conditions within reactor 120. In one embodiment, the sorbent particles employed in fluidized bed reactor 120 can comprise a support component comprising a silicate-resistant silica-containing component and a promoter metal component, as discussed in detail previously.

Referring back to FIG. 1, the sulfur-containing hydrocarbon stream in conduit 250 can be introduced into reactor 120, wherein the stream can be contacted with a plurality of sorbent particles under desulfurization conditions to at least partially desulfurize the hydrocarbon stream. In general, the desulfurization conditions employed in reactor 120 include a total pressure, temperature, and weight hourly space velocity. In one embodiment, the temperature in reactor 120 can be in the range of from about 95° C. (203° F.) to about 815° C. (1499° F.), about 260° C. (500° F.) to about 480° C. (896° F.), or 315° C. (599° F.) to 455° C. (851° F.). The total pressure can be in the range of from about 205 kPa (29.7 psia) to about 10,450 kPa (1,515.6 psia), about 450 kPa (65.2 psia) to about 4,250 kPa (616 psia), or 795 kPa (115 psia) to 1,480 kPa (215 psia). Weight hourly space velocity (WHSV) measures the mass flow rate (kg/h) at standard temperature and pressure (STP) per kilogram of sorbent present in the desulfurization zone of reactor 120. In one embodiment, the WHSV in reactor 120 can be in the range of from about 0.5 $h^{-1}$ to about 50 $h^{-1}$ or about 1 $h^{-1}$ to about 20 $h^{-1}$.

Optionally, other reactants, either alone or with a diluent, can be introduced into reactor 120. For example, in one embodiment, an additional reactant stream comprising at least about 25 volume percent, at least about 50 percent, at least about 75 percent, or at least 90 percent hydrogen can be introduced into the desulfurization zone of reactor 120. In one embodiment (not shown), the hydrogen-containing stream can be introduced directly into reactor 120. In another embodiment, the hydrogen-containing stream in conduit 216 can be combined with the sulfur-containing hydrocarbon feed stream in conduit 250 prior to entering reactor 120, as shown in FIG. 1.

In general, high purity hydrogen may not be required and diluents, such as, for example, methane, carbon dioxide, flue gas, nitrogen, and combinations thereof can additionally be present in the hydrogen-containing stream introduced into the desulfurization zone. According to one embodiment, at least a portion of the hydrogen-containing stream introduced into the desulfurization zone can originate from a component external to desulfurization system 110. In another embodiment, at least a portion of the hydrogen-containing stream can originate from within desulfurization system 110, such as, for example, from product separation/distillation zone 160, as shown in FIG. 1. According to one embodiment, the total amount of hydrogen introduced into reactor 120 can be such that the mole ratio of hydrogen to hydrocarbon in the desulfurization zone can be in the range of from about 0.01:1 to about 50:1, about 0.1:1 to about 10:1, or 0.2:1 to 2:1.

In one embodiment, the desulfurization conditions in reactor 120 can be sufficient to vaporize at least a portion of the sulfur-containing hydrocarbon stream introduced into reactor 120. In one embodiment, at least about 90 percent, at least about 95 percent, at least about 98 percent, or substantially all of the sulfur-containing hydrocarbon stream in conduit 250 can be in the vapor phase in the desulfurization zone of reactor 120.

When the sorbent composition is contacted with the sulfur-containing hydrocarbon fluid in the desulfurization zone, at least a portion of the sulfur compounds in the sulfur-containing stream can be removed from the hydrocarbon stream. While not wishing to be bound by theory, it is believed that at least a portion of the sulfur removed from the sulfur-containing fluid can be employed to convert at least a portion of a metal oxide (e.g., zinc oxide) of the sorbent composition to a metal sulfide (e.g., zinc sulfide). In contrast to most conventional sulfur removal processes (e.g., hydrodesulfurization), substantially none of the sulfur removed from the sulfur-containing feed stream is converted to hydrogen sulfide. Rather, in one embodiment, the desulfurized effluent stream exiting reactor 120 via conduit 222 can comprise less than about 200 weight percent, less than about 150 weight percent, or less than 100 weight percent of the total amount of hydrogen sulfide contained in the sulfur-containing feed stream in conduit 250.

After removing at least a portion of the sulfur from the hydrocarbon feed stream in the desulfurization zone of reactor 120, the resulting sulfur-laden sorbent and sulfur-depleted (e.g., desulfurized) hydrocarbon effluent stream can be separated according to any manner or method known in the art. Examples of solid/fluid separation mechanisms include, but are not limited to, cyclonic devices, settling chambers, impingement devices, filters, and combinations thereof. Once the desulfurized hydrocarbon effluent stream exits reactor 120 via conduit 222, at least a portion of the desulfurized hydrocarbon stream can be further processed in product separation/distillation zone 160, as shown in FIG. 1.

According to one embodiment, the desulfurization zone of reactor 120 can have an overall sulfur removal efficiency greater than about 50 percent, greater than about 80 percent, greater than about 90 percent, or greater than about 95 percent, wherein sulfur removal efficiency is defined according to the following formula: (mass of sulfur entering reactor 120 via stream in conduit 250—mass of sulfur in the sulfur-depleted hydrocarbon stream exiting product separation/distillation zone 160 in conduit 254)/(mass of sulfur entering reactor 120 via stream in conduit 250), expressed as a percentage. In general, the desulfurized hydrocarbon stream exiting desulfurization system 110 via conduit 254 can have an atomic sulfur content less than about 50 ppmw, less than about 20 ppmw, less than about 15 ppmw, less than about 10 ppmw, or less than 5 ppmw, based on the total weight of the stream.

As illustrated in FIG. 17 the separated, sulfur-laden sorbent particles exiting reactor 120 can then be routed via conduit 230 to reactor receiver 32. Thereafter, a portion of the sulfur-laden sorbent particles withdrawn from all reactor receiver 132 can be transported via conduit 232 to a reactor stripper 134 which can be operable to remove a portion or substantially all of the residual hydrocarbon material from the sorbent particles. The stripping zone defined within reactor stripper 134 can employ a stripping agent (e.g., nitrogen) and can be operated at a temperature in the range of from about 35° C. (95° F.) to about 535° C. (995° F.) and a pressure in the range of from about 275 kPa (39.9 psia) to about 3.550 kPa (515 psia). Stripping can be carried out for a period of time sufficient to achieve the desired level of stripping, which can generally be in the range of from about 0.1 to about 4 hours or about 0.3 to 1 hour. In an alternative embodiment, at least a portion of the stripping can be carried out in reactor receiver 132 in addition to or in the absence of reactor stripper 134.

As illustrated in FIG. 1, the sulfur-laden sorbent particles can then be transported via conduit 234 to a regeneration zone at least partially defined within regenerator 140, wherein at least a portion of the sorbent can be regenerated via contact with a regeneration gas stream introduced via conduit 236 tinder regenerating conditions. In one embodiment, the regeneration conditions can include a temperature in the range of from about 95° C. (203° F.) to about 815° C. (1499° F.), about 260° C. (500° F.) to about 650° C. (1209° F.), or 455° C. (851° F.) to 590° C. (1094° F.) and a pressure in the range of from about 175 kPa (25.4 psia) to about 10,450 kPa (1515.6 psia), or 205 kPa (29.7 psia) to about 795 kPa (115 psia). According to one embodiment of the present invention, the regeneration conditions can include an oxygen partial pressure greater than about 105 kPa (15.2 psia), greater than about 110 kPa (16 psia), or in the range of from about 115 kPa (16.7 psia) to about 160 kPa (23.2 psia) and/or a water partial pressure in the range of from about 105 kPa (15.2 psia) to about 205 kPa (29.7 psia), about 110 kPa (16 psia) to about 170 kPa (24.7 psia), or 115 kPa (16.7 psia) to 160 kPa (23.2 psia). Typically, the regeneration can be carried out for a period of time in the range of from about 0.05 to about 60 hours, about 0.1 to about 24 hours, about 0.2 to about 12 hours, or 0.25 to about 4 hours.

Although not wishing to be bound by theory, it has been posited that the oxygen-containing regeneration gas stream introduced into the regeneration zone of regenerator 140 via conduit 236 can fulfill several functions. For example, the regeneration gas can help promote the conversion of at least a portion of the metal sulfide (e.g., zinc sulfide) associated with the sulfurized sorbent back to metal oxide (e.g., zinc oxide), it can promote the return of at least a portion of the promoter metal component to its common oxidized (i.e., unreduced) state, and/or it can combust any residual hydrocarbon deposits present in or on the sorbent particles. As a result of one or more of these functions, the regenerator off-gas in conduit 238 comprises one or more of the following components: carbon dioxide, carbon monoxide, sulfur dioxide or trioxide, and/or oxygen. In one embodiment, at least a portion of the regenerator off-gas stream in conduit 238 can be sent to one or more downstream locations for further processing.

As discussed previously, the inventors have discovered that at least a portion of the regenerated sorbent particles withdrawn from the regeneration zone of regenerator 140 via conduit 240 can exhibit a surprisingly low in situ silicate generation rate, as compared to conventionally prepared desulfurization catalysts and sorbents exposed to similar regeneration conditions. According to one embodiment, the sorbent composition can have an in situ silicate generation rate less than about 0.25 percent metal per hour, less than about 0.20 percent metal per hour, less than about 0.175 percent metal per hour, or less than 0.15 percent metal per hour. In contrast, conventional sorbents typically exhibit an in site silicate generation rate in excess of 0.27 percent metal per hour under similar conditions. In one embodiment the metal can comprise zinc and the silicate generated can comprise zinc silicate.

As used herein, the term "in situ silicate generation rate," expressed in units of percent metal per unit time, refers to the total amount of metal oxide(s) converted to silicates under regeneration conditions divided by the total regeneration time of the sorbent composition. In one embodiment, in situ silicate generation rate can be expressed according to the following formula: (metal atoms converted in regenerated sorbent—metal atoms converted in initial sorbent)/total regeneration time, wherein "metal atoms converted" is expressed by the following formula: |(mass of metal in silicate compounds—mass of metal in other, non-silicate compounds)|/(total mass of metal in support component), expressed as a percentage. In one embodiment, the "initial sorbent particles" can comprise sulfur-laden sorbent particles, while, in another embodiment, the initial sorbent can comprise "fresh" particles added to the desulfurization system for the first time. According to one embodiment wherein the desulfurization system comprises a fluidized bed desulfurization system, the total regeneration time may be the average cumulative regeneration time experienced by a sorbent particle and may encompass one or more cycles. In another embodiment wherein the desulfurization system comprises a fixed or semi-fixed bed desulfurization system, the total regeneration time may be the total time the sorbent particles are exposed to regeneration conditions and may encompass a single regeneration cycle.

Further, the inventors have discovered that the inventive sorbent composition also exhibits surprisingly low silicate concentration after exposure to the above-discussed regeneration conditions for a given period of time. For example, in one embodiment of the present invention, sorbent particles having a total time-on-stream (TOS) greater than about 20, greater than about 25, greater than about 30, or greater than about 35 hours can have a total silicate concentration less than 5 weight percent, less than about 4.5 weight percent, or less than about 4 weight percent, based on the total weight of the sorbent composition. This, too, is in direct contrast to conventionally prepared sorbents and catalysts, which can exhibit silicate concentrations higher than 7.5 weight percent when subjected to the same regeneration conditions for less than 20 hours.

Referring back to FIG. 1, at least a portion of the regenerated sorbent particles withdrawn from regenerator 140 can be routed to regenerator receiver 136 and/or regenerator stripper 138 via conduits 240 and/or 244. In one embodiment, regenerator receiver 136 and regenerator stripper 138 can be operable to remove at least a portion or substantially all of any residual oxygen contained within or associated with the regenerated sorbent composition and can have similar structure and/or can be configured in a similar manner to reactor receiver 132 and/or reactor stripper 134, discussed in detail previously.

As shown in FIG. 1, at least a portion of the regenerated sorbent can then be transferred via conduit 246 to an optional reducer 150, wherein the sorbent particles can be at least partially reduced or "re-activated" via contact with a hydrogen-containing reduction gas stream (not shown) under reduction conditions. In one embodiment, reduction conditions can include a temperature in the range of from about 150° C. (302° F.) to about 540° C. (1004° F.), about 260° C. (500° F.) to about 480° C. (896° F.), or 315° C. (599° F.) to 455° C. (851° F.) and a pressure in the range of from about 175 kPa (25.4 psia) to about 10,450 kPa (1515.6 psia), or 205 kPa (29.7 psia) to about 795 kPa (115 psia). Typically, the average residence time of a sorbent particle in reducer 150 can be in the range of from about 0.1 hours to about 40 hours, about 0.2 hours to about 10 hours, or 0.5 hours to 1 hour. In one embodiment, the reduction gas stream comprises at least about 25 volume percent, at least about 50 volume percent, at least about 90 volume percent, or at least 95 volume percent hydrogen. Once the sorbent has been reactivated, the solid particles can be reintroduced into reactor 120 via conduit 250 and can continue on through desulfurization system 110 as discussed above.

EXAMPLES

The following examples are intended to be illustrative of the present invention and to teach one of ordinary skill in the art to make and use the invention. These examples are not intended to limit the invention in any way.

Example 1

Interaction of Strontium with Perlite and Kaolin

This example describes a procedure used to characterize at least a portion of the chemical and/or physical associations formed between a silicate-inhibiting metal (e.g., strontium) and a silica-containing component (e.g., perlite).

Two samples of perlite (Sil-Kleer™ 27M, available from Silbrico Corporation of Hodgkins, Ill.), designated Sample A and Sample B, were contacted with aqueous strontium nitrate solutions such that the resulting impregnated perlite samples respectively contained 1 weight percent (Sample A) and 5 weight percent (Sample B) of impregnated strontium, based on the total weight of the sample. Sample A and Sample B were both dried in a rotary evaporator at 90° C. under vacuum for 3-4 hours. Next, both samples were calcined by first heating at a 2° C. per minute rate under nitrogen until the temperature reached 950° C. and then holding the temperature at 950° C. for 7 hours. Both samples were tested via x-ray fluorescence (XRF) and x-ray diffraction (XRD) and the results are presented in Tables 5 and 6, below.

TABLE 5

XRF Results for Strontium-Treated Perlite, 1 and 5 wt % Loadings

| Element | Sample A, weight % | Sample B, weight % |
| --- | --- | --- |
| Aluminum | 7.49 | 6.92 |
| Calcium | 0.45 | 0.40 |
| Iron | 0.45 | 0.51 |
| Potassium | 3.73 | 4.30 |
| Magnesium | 0.06 | 0.11 |
| Sodium | 3.31 | 2.36 |
| Manganese | 0.07 | 0.05 |
| Silica | 34.50 | 33.00 |
| Strontium | 1.04 | 5.20 |
| Titanium | 0.04 | 0.06 |
| Tungsten | 0.04 | 0.00 |

TABLE 6

XRD Results for Strontium-Treated Perlite, 1 And 5 wt % Loadings

| Phase | Sample A, weight % | Sample B, weight % |
| --- | --- | --- |
| Perlite/Silica/Meta-kaolin | 93.7 | 98.8 |
| Strontium Oxide | 0 | 0.2 |
| Tristrintium Cyclo-tri | 0 | 0.5 |
| Strontium aluminosilicate-Strontium | 0 | 0.5 |
| Slawsonite, Strontium | 2.6 | — |
| Cristobalite-alpha | 1.3 | — |
| Quartz | 2.3 | — |

Although the XRF results in Table 5 show that Samples A and B respectively contained more than 1 and 5 weight percent strontium, the XRD results in Table 6 demonstrate that only trace amounts (i.e., 0 and 0.5 weight percent for Samples A and B, respectively) of new strontium-containing crystalline phases. Thus, as evidenced by a comparison of the XRD and XRF results shown in Tables 5 and 6, a majority of the impregnated strontium did not form a new crystalline phase with the perlite during the calcining step, but rather, was assimilated into the amorphous structure of the perlite, forming a generally non-crystalline association with the perlite, as evidenced by the relatively minor amount of strontium-containing crystalline phases detected via XRD.

Example 2

Preparation of Desulfurization Sorbent including Strontium-Treated Silica-Containing Components This example describes the procedure used to prepare two desulfurization sorbent compositions (i.e., Sorbents C and D). Comparative Sorbent composition C employed a conventional perlite and kaolin, while inventive Sorbent D employed strontium-treated perlite and kaolin. The procedure used to prepare the strontium-treated perlite and kaolin is also described in Part 1, herein.

Part 1. Preparation of Strontium-Treated Perlite and Kiolin

The strontium-treated perlite and kaolin were prepared by first impregnating one hundred grams each of kaolin (available as ASP® 600 from Englehard-BASF in Florham Park, N.J.) and perlite (Sil-Kleer™ 27M, available from Silbrico Corporation in Hodgkins, Ill.) by incipient wetness techniques with an aqueous strontium nitrate solution. The resulting impregnated kaolin and perlite each had a 3 weight percent strontium loading, based on the total weight of the perlite or kaolin. Both impregnated samples were then calcined under nitrogen at 650° C. for 7 hours. If agglomerates were observed in the calcined samples, the samples were ground in a mechanical grinder until a fine powdery consistency was achieved.

The resulting calcined, strontium-treated perlite and calcined, strontium-treated kaolin were then separately washed with 10 liters of distilled water in Buchner funnels in order to remove any residual soluble strontium. After washing, the strontium-treated samples were dried in air at 110° C. overnight. After drying the samples were re-crushed via a mechanical grinder to remove any coarse grit and the resulting powders were analyzed via XRF, the results of which are presented in Table 7, below.

TABLE 7

XRF Results for Strontium-Treated Perlite and Kaolin

| Element | Component | |
| --- | --- | --- |
| | Perlite | Kaolin |
| Aluminum | 20.80 | 6.81 |
| Calcium | — | 0.38 |
| Iron | 0.61 | 0.49 |
| Potassium | 0.20 | 4.36 |
| Magnesium | 0.07 | 0.11 |
| Sodium | 0.13 | 2.26 |
| Phosphorous | 0.03 | — |
| Silica | 20.30 | 34.10 |
| Strontium | 3.30 | 2.15 |
| Titanium | 0.92 | 0.06 |
| Manganese | — | 0.05 |

In addition, the crystalline Phases of the strontium-treated kaolin and strontium-treated perlite were each analyzed via XRD. The strontium-treated kaolin XRD indicated the presence of kaolinite, muscovite, and a trace amount of anatase ($TiO_2$). No strontium phases were visible. The XRD of the strontium-treated perlite indicated the presence of amorphous silica (i.e., perlite) and a trace amount of impure quartz. Similarly to the strontium-treated kaolin, no strontium phases were visible in the strontium-treated perlite.

Part II: Preparation of Desulfurization Sorbents

Comparative Sorbent C was prepared by first adding 1.46 grams of concentrated nitric acid to 229.9 grams of distilled water and then allowing the combination to mix for approximately five minutes. After 5 minutes the pH of the solution was measured and found to be 2.96. Next, 50.00 grams of perlite (Sil-Kleer™ 27M, available from Silbrico Corporation, Hodgkins, Ill., United States) was added to the nitric acid solution and allowed to stir for 15 minutes. The pH of the slurry was measured and determined to be 8.24.

Next, another slurry was formed by adding 50.37 grams of alumina (Dispal® Aluminum Powder, available from CONDEA Vista Company in Houston, Tex.) into 119.2 grams of distilled water. The slurry was allowed to stir for 20 minutes and the pH was measured at 2.56.

Next, over a five minute period, the first perlite/nitric acid slurry was poured into the second alumina slurry and allowed to stir. The pH was measured and determined to be 4.62. Thereafter, 39.82 grams of kaolin clay (available as ASP®600 from Englehard-BASF in Florham Park, N.J.) was added to the combined slurry and was allowed to mix for 5 minutes. The resulting slurry had a pH of 5.9. Next, 185.2 grams of zinc oxide (available from Zinc Corporation in Monaca, Pa.) was added to the solution and allowed to stir for 15 minutes. The pH was measured and found to be 7.08 and the combined slurry was allowed to mix for an additional 15 minutes, Finally, to reduce the solids content below an acceptable level to facilitate spray drying, an additional 336 grams of distilled water was subsequently added to the slurry, which was subsequently spray dried.

The spray dried particulates were then impregnated with 16 weight percent nickel, via impregnation with a nickel nitrate solution. The resulting impregnated particles were placed in a muffle furnace, heated to 150° C. at a rate of 3° C. per minute, and held for 1 hour. The temperature was increased at 5° C. per minute to 635° C. and held for 1 hour. The resulting sorbent composition was designated comparative Sorbent C. Sorbent D was prepared in a similar manner to comparative Sorbent C, described above, except rather than adding commercially available kaolin clay and perlite, Sorbent D was prepared with 50.0 grams of the strontium-treated perlite and 39.82 grams of the strontium-treated kaolin, the preparation of which was described in Example 1. The spray dried particles of Sorbent D were impregnated with nickel, dried, and calcined in a similar manner as previously described with respect to comparative Sorbent C. The resulting sorbent composition was designated inventive Sorbent D.

Several experiments were conducted that compare various physical and chemical properties of Sorbents C and D). Including, for example, desulfurization activity, zinc silicate formation rate, hardness, and composition. The results for each test are summarized in Examples 3-6, below.

Example 3

Testing for Desulfurization Activity

This example illustrates the performance of comparative Sorbent C and inventive Sorbent D, described in Example 2, above, in a cyclic desulfurization process.

Fifteen grams of comparative Sorbent C and inventive Sorbent D, prepared in a manner as described in Example 2, were each combined with 40 grams of inert support material and were then separately loaded into a ½-inch diameter quartz tube reactor having a length of about 12 inches. The sorbent/support mixtures were placed on a glass frit near the upper portion of the respective reactors, and the sorbent mixtures were reduced via contact with 1 standard cubic foot per hour (scfh) of hydrogen at a temperature of 750° F. (398.9° C.) and a pressure of 200 psig (1,379 kPa gauge) for a time period of 2 hours.

Cracked gasoline having a sulfur content of approximately 1,800 ppm by weight was pumped upwardly through each reactor at a flow rate of 106 mL/h, along with 0.36 standard cubic feed per hour (scth) of hydrogen. The reactor beds were maintained at a temperature of 750° F. (398.9° C.) and 200 psig (1,379 kPa gauge) for 12 hours during desulfurization.

Once the desulfurization step was complete, tile flow of gasoline to each reactor was terminated and the sulfurized sorbent was regenerated with 0.5 scfh air at a temperature of 1,000° F. (537.8° C.) and a pressure of 200 psig (1.379 kPa gauge) for about 1 hour. The temperature of each reactor was then reduced to 750° F. (398.9° C.) and the regenerated sorbent in each reactor was reduced via contact with hydrogen as discussed previously.

The above-described desulfurization cycle was repeated eight additional times for each of Sorbents C and D. During the ninth cycle, samples of desulfurized cracked gasoline were withdrawn from each reactor at various times and were analyzed for sulfur content. The results of the sulfur analyses for comparative Sorbent C and inventive Sorbent D, as a function of time-on-stream (TOS) for each sorbent are presented in FIG. 2.

Figure 2:
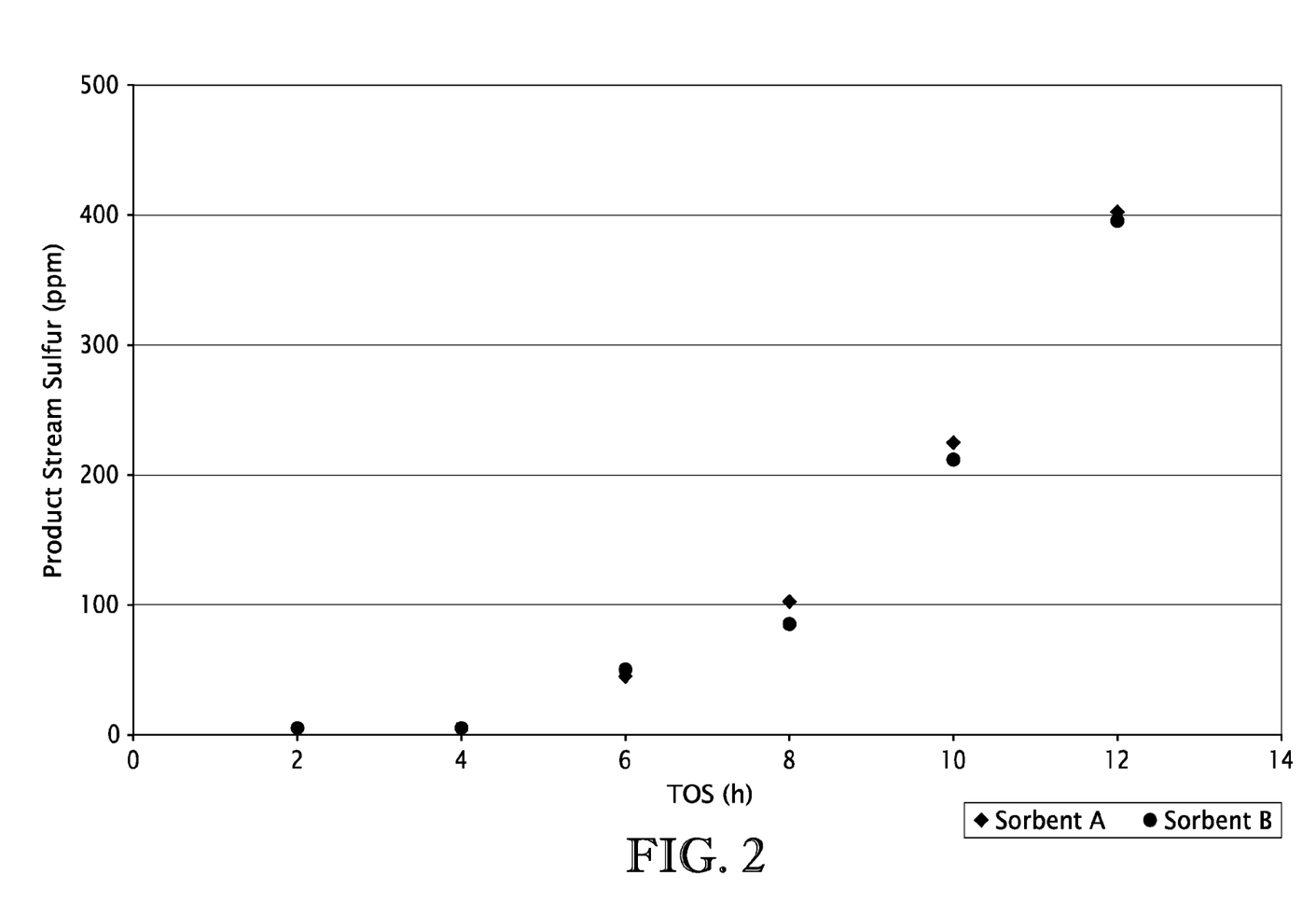
FIG. 2 is a graph plotting product stream sulfur content as a function of total time-on-stream (TOS) for desulfurization tests summarized in the EXAMPLES section.

FIG. 2 demonstrates that inventive Sorbent D had similar desulfurization activity as compared to comparative Sorbent C. Thus, the presence of a strontium-treated silica-containing component in inventive Sorbent D did not seem to adversely affect the desulfurization activity of a sorbent, when prepared according to one embodiment of the present invention.

Example 4

Testing for Zinc Silicate Formation Rate

This example illustrates the relative in situ formation rate of zinc silicate for comparative Sorbent C and inventive Sorbent D, as described in Example 2, after exposure to a desulfurization process, as described in Example 3.

After completing the ninth desulfurization cycle, as previously described in Example 3, regenerated Sorbent C and regenerated Sorbent D were contacted with an air stream having a water partial pressure of 5 psig (34.5 kPa gauge) at a temperature of 1,000° F. (537.8° C.) for 165 hours. Samples of Sorbents C and D were withdrawn from the reactor at various times and analyzed via XRD for the presence of zinc silicate. The results of the zinc silicate analyses are presented, as a function of TOS, in FIG. 3.

Figure 3:
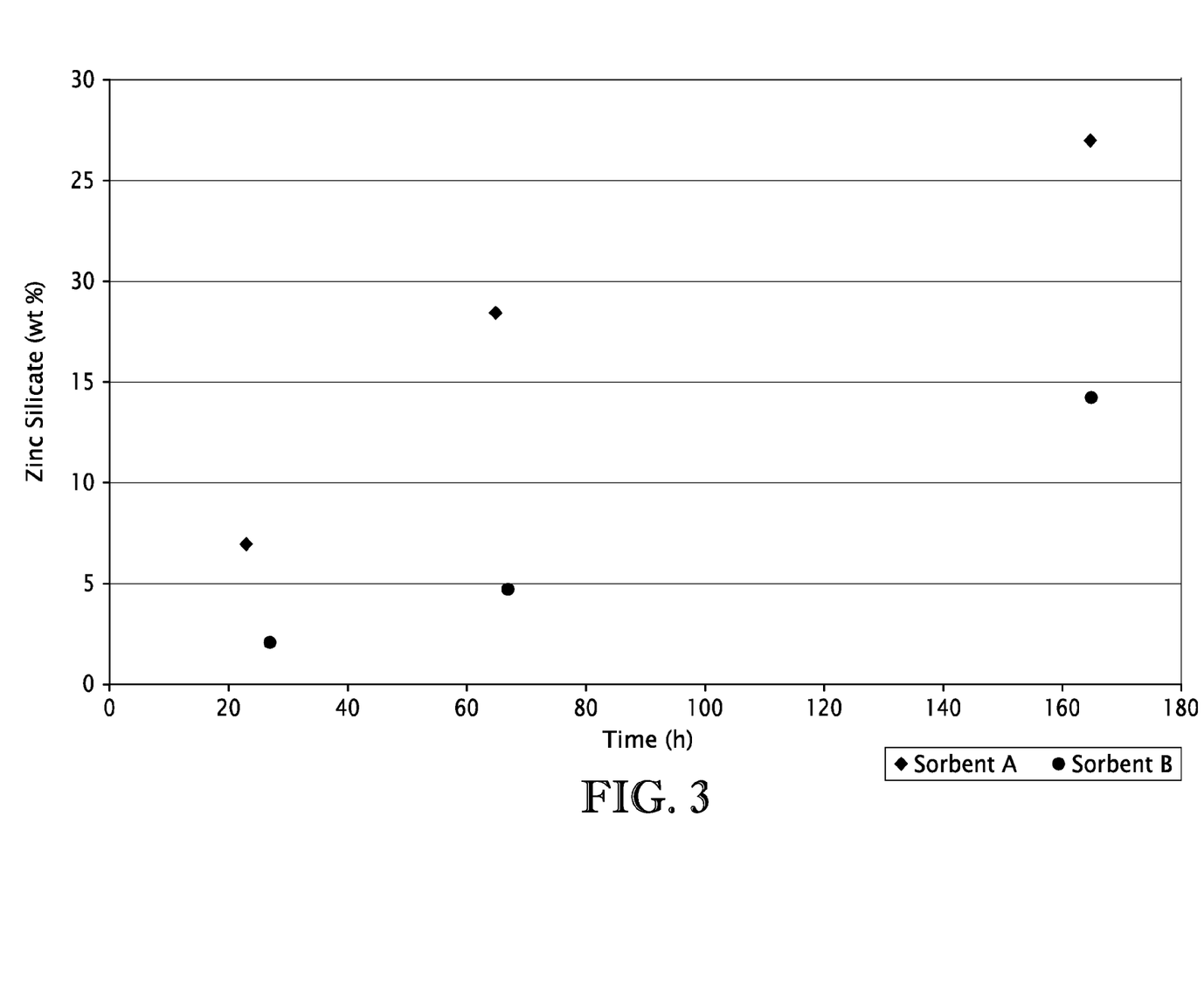
FIG. 3 is a graph plotting the zinc silicate concentration of the sorbent composition as a function of total time-on-stream (TOS) For desulfurization tests summarized in the EXAMPLES section.

FIG. 3 demonstrates that, for the same time-on-stream, inventive Sorbent D exhibited a lower concentration of zinc silicate formation than comparative Sorbent C. In other words, inventive Sorbent D exhibited a lower in situ silicate generation rate than comparative Sorbent C.

Example 5

Testing for Hardness

This example illustrates the relative hardness of comparative Sorbent C and inventive Sorbent D, as described in Example 2.

Initial samples of comparative Sorbent C and inventive Sorbent D were screened to provide screened samples having a particle size in the range of 100 to 325 microns. Fifty grams of each screened sample were separately loaded into 1.5-inch diameter tubes. The sorbent in each tube was aerated with air at a flow rate of 7 liters per hour (L/h) for a period of 1 hour. A filtration zone above the tube collected any entrained material and, at the end of the test, the amount of material entrained in the filtration zone above the tube was measured. Results were presented in "percent carryover," or the amount of entrained material captured in the filter, expressed as a percentage of the original sorbent loading. Comparative Sorbent C exhibited a 4.2 weight percent carryover, while inventive Sorbent D demonstrated a 13.3 weight percent carryover. These results demonstrate the inventive Sorbent D had a relatively lower hardness (i.e., is relatively softer) than comparative Sorbent C.

Example 6

XRD and XRF Analyses

In this example, the results of X-ray diffraction (XRD) and X-ray fluorescence (XRF) analyses performed on various samples of Sorbents C and D are presented. One sample each of (1) freshly prepared sorbent as described in Example 2 (i.e., "fresh"), (2) sorbent exposed to desulfurization conditions as described in Example 3 (i.e., "sulfur-treated"); and (3) sorbent exposed to the silicate formation conditions as described in Example 4 (i.e., "steam-treated") of both Sorbents C and D were subjected to XRD and XRF analyses. The XRD results, which are summarized using the Rietveld Phase Filter technique, are presented in Table 8, while the results of the elemental XRF analysis are presented in Table 9, below.

TABLE 8

Summary of XRD Results for Sorbents C and D using Rietveld Phase Filter Technique

| Phase | Property | Sorbent A (Comparative) | | | Sorbent B (Inventive) | | |
|---|---|---|---|---|---|---|---|
| | | Fresh | Sulfur Treated | Steam Treated | Fresh | Sulfur Treated | Steam Treated |
| Perlite/Kaolin | wt % | 14.4 | 16.2 | 14.3 | 19 | 16.2 | 18.4 |
| Ni/ZnO | wt % | 19.9 | — | 15.7 | 23 | — | 18.2 |
| | Cryst. Size WH | 638 | — | 605 | 585 | — | 639 |
| | Strain × $10^3$ | 0.46 | — | 0.43 | 0.63 | — | 0.44 |
| | Frac. Ni ($a^0$) | 0.76 | — | 0.90 | 0.76 | — | 0.89 |
| Crystalline ZnO | wt % | 27.1 | 10.8 | 21.9 | 30.9 | 15.2 | 27.8 |
| | Cryst. Size WH | 587 | 578 | 770 | 674 | 601 | 0 |
| | Strain × $10^3$ | <0.01 | 0.10 | 0.39 | <0.01 | <0.01 | 0.17 |
| Amorphous ZnO | wt % | 16.8 | 14.3 | 11.9 | 2.5 | 0.0 | 6.0 |
| Ni/Zn Aluminate Gahnite | wt % | 21.4 | 23.7 | 26.6 | 24.2 | 22 | 23.4 |
| | Cryst. Size WH | 244 | 72 | 159 | 219 | 44 | 132 |
| | Strain × $10^3$ | 3.01 | <0.01 | 0.72 | 3.18 | <0.01 | 1.53 |
| | Frac. Ni ($a^0$) | 0.43 | 0.06 | 0.08 | 0.48 | 0.21 | 0.39 |
| Zinc Sulfide Sphalerite | wt % | — | 8.6 | — | — | 11.3 | — |
| | CDS - Scherrer | — | 125 | — | — | 145 | — |
| Zinc Sulfide Wurtsite | wt % | — | 11.9 | — | — | 16.6 | — |
| | CDS - Scherrer | — | 16 | — | — | 15 | — |
| Ni metal - low Zn | wt % | — | 7.6 | — | — | 11.2 | — |
| | Cryst. Size WH | — | 301 | — | — | 315 | — |
| | Strain × $10^3$ | — | 0.95 | — | — | 0.51 | — |
| | Frac. Ni ($a^0$) | — | 0.95 | — | — | 0.96 | — |

TABLE 8-continued

Summary of XRD Results for Sorbents C and D
using Rietveld Phase Filter Technique

| | | Sorbent A (Comparative) | | | Sorbent B (Inventive) | | |
|---|---|---|---|---|---|---|---|
| Phase | Property | Fresh | Sulfur Treated | Steam Treated | Fresh | Sulfur Treated | Steam Treated |
| Ni metal - high Zn | wt % | — | 4 | — | — | 5.1 | — |
| | Cryst. Size WH | — | 736 | — | — | 767 | — |
| | Strain × $10^3$ | — | 1.32 | — | — | 1.11 | — |
| | Frac. Ni ($a^0$) | — | 0.69 | — | — | 0.67 | — |
| Zinc Silicate | wt % | 0.3 | — | 7 | 0.2 | — | 2.1 |
| | CDS - Scherrer | 280 | — | 140 | 280 | — | 130 |
| | Strain × $10^3$ | nd | — | >2000 | nd | — | 1663 |
| | Strain WH | nd | — | 1.11 | nd | — | 1.06 |
| Zinc Oxysulfate | wt % | — | — | — | — | — | 2.8 |
| | CDS - Scherrer | — | — | — | — | — | 245 |

TABLE 9

Summary of XRF Results for Sorbents C and D

| | Sorbent C (Comparative) | | | Sorbent D (Inventive) | | |
|---|---|---|---|---|---|---|
| Element | Fresh | Sulfur Treated | Steam Treated | Fresh | Sulfur Treated | Steam Treated |
| Sodium | — | <2 | — | — | <2 | — |
| Aluminum | 7.19 | 9.1 | 8.9 | 8.4 | 8.5 | 8.3 |
| Silica | 5.29 | 6.16 | 6.39 | 7.02 | 6.07 | 7.03 |
| Phosphorous | 0.015 | — | — | — | — | — |
| Sulfur | — | 6.3 | — | — | 6.4 | — |
| Potassium | 0.43 | 0.42 | 0.44 | 0.57 | 0.46 | 0.47 |
| Calcium | 0.05 | 0.06 | 0.07 | 0.05 | 0.05 | 0.06 |
| Titanium | 0.09 | 0.08 | 0.09 | 0.13 | 0.11 | — |
| Iron | 0.13 | 0.15 | 0.17 | 0.17 | 0.17 | 0.14 |
| Nickel | 16.8 | 12.8 | 14.2 | 15.7 | 14.3 | 13.9 |
| Zinc | 41.8 | 35.1 | 38.5 | 37.3 | 34.9 | 37.5 |

Table 8 demonstrated that inventive Sorbent D had a lower rate of in situ silicate formation than comparative Sorbent C. For example, the steam-treated sample of inventive Sorbent D showed only 2 weight percent zinc silicate, while the steam-treated sample of comparative Sorbent C comprised greater than 7 weight percent zinc silicate.

In addition, according to the results presented in Table 8, inventive Sorbent D also had a higher sulfur storage capacity than comparative Sorbent C. For example, the sulfur-treated sample of inventive Sorbent D comprised approximately 28 weight percent total ZnS, which correlates to sulfur storage capacity, while the sulfur-treated sample of comparative Sorbent C comprised less than 21 weight percent total ZnS. Further, once regenerated, inventive Sorbent D exhibited a higher concentration of active metals (e.g., 16.6 weight percent) than comparative Sorbent C (e.g., 11.9 weight percent), further evidencing the increased sulfur storage capacity of inventive Sorbent D.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

DEFINITIONS

As used herein, the terms "a," "an," "the," and "the" mean one or more.

As used herein, the term "and/or," when used in a list of two or more items, means that any one of the listed items can be employed by itself or any combination of two or more of the listed items can be employed. For example if a composition is described as containing components A, B, and/or C, the composition can contain A alone; B alone; C alone; A and B in combination; A and C in combination; B and C in combination; or A, B, and C in combination.

As used herein the term "bound-silica silica-containing component" refers to a silica-containing component that does not comprise and/or is generally incapable of producing free silica under the operating conditions of one or more types of desulfurization systems employed according to various embodiments of the present invention.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "containing," "contains," and "contain" have the same open-ended meaning as "comprising," "comprises," and "comprise" provided above.

As used herein, the term "cracked-gasoline" denotes a mixture of hydrocarbons boiling in a range of from about 35° C. to about 260° C., or any traction thereof, that are products of either thermal or catalytic processes that crack larger hydrocarbon molecules into smaller molecules.

As used herein, the term "desulfurization conditions" refer to any conditions necessary to remove at least a portion of the sulfur and/or sulfur-containing compounds from a hydrocarbon stream.

As used herein, the term "diesel fuel" denotes a mixture of hydrocarbons boiling in a range of from about 150° C. to about 400° C., or any fraction thereof.

As used herein, the term "free silica" refers to a silica form that is either (1) in a free form available to react with another compound, such as, for example, a metal oxide; or (2) convertible to or capable of producing free silica under at least a portion of the operating conditions in one or more types of desulfurization systems.

As used herein, the term "free-silica silica-containing component" refers to a silica-containing component comprising and/or capable of producing free silica under the operating conditions of one or more types of desulfurization systems employed according to various embodiments of the present invention.

As used herein, the term "gasoline" denotes a mixture of hydrocarbons boiling in a range of from about 35° C. to about 260° C., or any fraction thereof.

As used herein, the terms "having," "has," and "have" have the same open-ended meaning as "comprising," "comprises," and "comprise" provided above.

As used herein, the term "in situ silicate generation rate," refers to the total amount of metal oxide(s) converted to silicates under regeneration conditions divided by the total regeneration time of the sorbent composition, expressed in units of percent metal per unit time.

As used herein, the terms, "including," "include," and "included" have the same open-ended meaning as "comprising," "comprises," and "comprise" provided above.

As used herein, the term "metal" generally refers to an elemental metal or other metal-containing compound.

As used herein, the term "metal oxide" refers to a metal oxide and/or a metal oxide precursor.

As used herein, the term "reduced-valence promoter metal" refers to a promoter metal having a valence with is less than the valence of the promoter metal component in its common oxidized state.

As used herein, the term "regeneration conditions" refer to conditions necessary to remove at least a portion of sorted sulfur from the sulfur-laden sorbent.

As used herein, the term "silicate" refers to any compound comprising silicon, oxygen, and one or more metals with or without hydrogen.

As used herein, the term "silicate-inhibiting metal" refers to a metal selected from the group consisting of rare earth metals, alkaline earth metals, and combinations thereof.

As used herein, the term "silicate-resistant silica-containing components" refers to a silica-containing component comprising at least about 0.5 weight percent, based on the total weight of the silica-containing component, of one or more silicate-inhibiting metals.

As used herein, the terms "sorb" and/or "sorption" refer to any type of physical and/or chemical adsorption and/or absorption.

Claims Not Limited to the Disclosed Embodiments

The preferred forms of the invention described above are to be used as illustration only, and should not be used in a limiting sense to interpret the scope of the present invention, Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materiality departing from but outside the literal scope of the invention as set forth in the following claims.

What is claimed is:

1. A sorbent composition comprising a physically-bound mixture of at least:
   (a) a plurality of silica-containing particles comprising free silica and a barrier formed by reacting at least a portion of said free silica with a silicate-inhibiting metal selected from the group consisting of rare earth metals, alkaline earth metals, and combinations thereof;
   (b) a zinc component; and
   (c) a promoter metal,
   wherein at least 75 weight percent of the total amount of said silicate-inhibiting metal present in said sorbent composition is concentrated in said plurality of silica-containing particles.

2. The sorbent composition of claim 1, wherein substantially all of said silicate-inhibiting metal is concentrated in said silica-containing particles.

3. The sorbent composition of claim 1, wherein said silicate-inhibiting metal is selected from the group consisting of strontium, barium, lanthanum, and combinations thereof.

4. The sorbent composition of claim 3, wherein said silicate-inhibiting metal is present in said sorbent composition in an amount in the range of from 0.0375 weight percent to 2 weight percent, based on the total weight of said sorbent composition.

5. The sorbent composition of claim 1, wherein said silicate-inhibiting metal is strontium.

6. The sorbent composition of claim 1, wherein said sorbent composition comprises a substitutional solid metal solution comprising said promoter metal and at least a portion of said zinc component, wherein said substitutional solid metal solution is characterized by the formula $M_A Zn_B$, wherein M is said promoter metal and A and B are numeric values in the range of from about 0.01 to about 0.99.

7. The sorbent composition of claim 1, wherein said sorbent composition comprises a substitutional solid metal solution comprising said promoter metal and at least a portion of said zinc component, wherein said substitutional solid metal solution is characterized by the formula $M_X Zn_Y O$, wherein M is said promoter metal, wherein X and Y are numeric values in the range of from about 0.01 to about 0.99.

8. The sorbent composition of claim 1, wherein said sorbent composition comprises a substitutional solid metal solution comprising zinc oxide.

9. The sorbent composition of claim 1, wherein said sorbent composition further comprises an alumina-containing component.

10. The sorbent composition of claim 9, wherein said alumina-containing component comprises zinc aluminate.

11. The sorbent composition of claim 9, wherein said zinc component is present in an amount in the range of from about 10 to about 90 weight percent, wherein said alumina-containing component is present in an amount in the range of from about 1 to about 30 weight percent, wherein said plurality of silica-containing particles are present in an amount in the range of from about 5 to about 85 weight percent, wherein said promoter metal is present in an amount in the range of from about 1 to about 60 weight percent, wherein said weight percents are based on the total weight of said sorbent composition.

12. The sorbent composition of claim 1, wherein said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, rhodium, and combinations thereof.

13. The sorbent composition of claim 1, wherein said promoter metal is nickel.

14. The sorbent composition of claim 1, wherein said silica-containing particles are selected from the group consisting of perlite, expanded perlite, diatomite, silicalite, silica colloid, flame-hydrolyzed silica, hydrolyzed silica, silica gel, precipitated silica, perlite, and combinations thereof.

15. The sorbent composition of claim 1, wherein said silica-containing particles are perlite.

16. The sorbent composition of claim 1, wherein at least about 55 weight percent of said silicate-inhibiting metal forms a generally non-crystalline association with said silica-containing particles.

17. The sorbent composition of claim 1, wherein said sorbent composition comprises silicates in an amount less than 3 weight percent, based on the total weight of said sorbent composition.

18. The sorbent composition of claim 1, wherein said silica-containing particles and/or said sorbent composition are substantially free of zeolites.

19. The sorbent composition of claim 1, wherein said silicate-inhibiting metal is present in said sorbent composition in an amount in the range of from 0.025 weight percent to 5 weight percent, based on the total weight of said sorbent composition.

20. The sorbent composition of claim 1, wherein said physically-bound mixture comprises a physically-bound mixture that has been calcined at a temperature in the range of from 200° C. to 985° C.

21. The sorbent composition of claim 20, wherein said sorbent composition comprises silicates in an amount less than about 1 weight percent, based on the total weight of said sorbent composition, and/or wherein said silica-containing particles comprise silicates in an amount less than 5 weight percent, based on the total weight of said silica-containing particles.

22. The sorbent composition of claim 21, wherein at least about 85 weight percent of said silicate-inhibiting metal forms a generally non-crystalline association with said silica-containing particles.

23. The sorbent composition of claim 1, wherein at least 95 weight percent of the total amount of said silicate-inhibiting metal present in said sorbent composition is concentrated in said plurality of silica-containing particles.

24. The sorbent composition of claim 23, wherein said silicate-inhibiting metal is strontium.

25. The sorbent composition of claim 1, wherein said silicate-inhibiting metal is present in said plurality of silica-containing particles in an amount of at least 0.75 weight percent, based on the total weight of said silica-containing particles, wherein said silicate-inhibiting metal is present in said sorbent composition in an amount of less than 0.5 weight percent, based on the total weight of said sorbent composition.

26. The sorbent composition of claim 1, wherein said silicate-inhibiting metal is present in said plurality of silica-containing particles in an amount in the range of between 1 and 10 weight percent, based on the total weight of said silica-containing particles, wherein said silicate-inhibiting metal is present in said sorbent composition in an amount of less than 0.1 weight percent, based on the total weight of said sorbent composition.

27. A sorbent composition comprising the calcined product of a physically bound mixture comprising:
(a) a plurality of silica-containing particles comprising strontium in an amount in the range of from about 0.5 to about 20 weight percent, based on the total weight of said silica-containing particles;
(b) zinc oxide;
(c) an alumina-containing component; and
(d) a promoter metal,
wherein substantially all of said strontium present in said sorbent composition is concentrated in said silica-containing particles.

28. The sorbent composition of claim 27, wherein said promoter metal is selected from the group consisting of nickel, cobalt, iron, manganese, tungsten, silver, gold, copper, platinum, zinc, tin, ruthenium, molybdenum, antimony, vanadium, iridium, chromium, palladium, rhodium, and combinations thereof.

29. The sorbent composition of claim 27, wherein said promoter metal is nickel.

30. The sorbent composition of claim 27, wherein said zinc oxide is present in said physically bound mixture an amount in the range of from about 5 to about 80 weight percent, wherein said alumina-containing component is present in said physically bound mixture in an amount in the range of from about 1 to about 50 weight percent, wherein said silica-containing particles are present in said physically bound mixture in an amount in the range of from about 5 to about 50 weight percent, wherein said promoter metal is present in said physically bound mixture in an amount in the range of from about 5 to about 70 weight percent, wherein said weight percents are based on the total weight of said sorbent composition.

31. The sorbent composition of claim 27, wherein said sorbent composition comprises a substitutional solid metal solution comprising at least a portion of said zinc oxide and/or at least a portion of said promoter metal.

32. The sorbent composition of claim 31, wherein said substitutional solid metal solution is characterized by the formula $M_A Zn_B$, wherein M is said promoter metal and A and B are numeric values in the range of from about 0.01 to about 0.99.

33. The sorbent composition of claim 31, wherein said substitutional solid metal solution is characterized by the formula $M_x Zn_y O$, wherein M is said promoter metal, wherein X and Y are numeric values in the range of from about 0.01 to about 0.99.

34. The sorbent composition of claim 31, wherein said substitutional solid metal solution comprises zinc aluminate.

35. The sorbent composition of claim 27, wherein said silica-containing particles are perlite.

36. The sorbent composition of claim 27, wherein said sorbent composition comprises silicates in an amount less than 3 weight percent, based on the total weight of said sorbent composition.

37. The sorbent composition of claim 27, wherein said silica-containing particles comprise silicates in an amount less than 50 weight percent, based on the total weight of said silica-containing particles.

38. The sorbent composition of claim 27, wherein at least about 55 weight percent of said silicate-inhibiting metal forms a generally non-crystalline association with said silica-containing particles.

39. The sorbent composition of claim 27, wherein said strontium is present in said sorbent composition in an amount in the range of from 0.025 weight percent to 5 weight percent, based on the total weight of said sorbent composition.

40. The sorbent composition of claim 39, wherein said strontium is present in said sorbent composition in an amount in the range of from 0.0375 weight percent to 2 weight percent, based on the total weight of said sorbent composition.

41. The sorbent composition of claim 27, wherein said silicate-inhibiting metal is present in said plurality of silica-containing particles in an amount of at least 0.75 weight percent, based on the total weight of said silica-containing particles, wherein said silicate-inhibiting metal is present in said sorbent composition in an amount of less than 0.5 weight percent, based on the total weight of said sorbent composition.

* * * * *